United States Patent [19]

McKenzie

[11] Patent Number: 4,563,207

[45] Date of Patent: Jan. 7, 1986

[54] CLAY-BREAKING AND FERTILIZING COMPOSITION AND METHOD OF BREAKING AND FERTILIZING HEAVY AND COMPACTED SOILS

[76] Inventor: David L. McKenzie, 26 Rivermead, Cullompton, Devon, United Kingdom

[21] Appl. No.: 534,246

[22] Filed: Sep. 21, 1983

[51] Int. Cl.$^4$ .................................................. C05F 3/00
[52] U.S. Cl. .......................................... 71/21; 71/13; 71/903
[58] Field of Search .................... 71/1, 11, 13, 21, 903

[56] References Cited

U.S. PATENT DOCUMENTS

| 4,006,005 | 2/1977 | Seferian et al. | 71/21 X |
| 4,078,094 | 3/1978 | Katzen | 71/21 X |

FOREIGN PATENT DOCUMENTS

| 705730 | 3/1954 | United Kingdom . |
| 765619 | 1/1957 | United Kingdom . |
| 886951 | 1/1962 | United Kingdom . |
| 1115525 | 5/1968 | United Kingdom . |
| 1244247 | 8/1971 | United Kingdom . |
| 1327398 | 8/1973 | United Kingdom . |

*Primary Examiner*—Ferris H. Lander
*Attorney, Agent, or Firm*—Cushman, Darby & Cushman

[57] ABSTRACT

A clay-breaking and fertilizing composition comprises a finely ground mixture of chicken manure, muriate of potash and a rock phosphate having a high limestone content and containing the phosphate in the form of the basic tricalcium diphosphate. When spread on heavy, clay soils or compacted ground and watered, the composition breaks up the soil and fertilizes it such that, after two to three months the soil is friable and immediately ready for crop cultivation. The composition is also usable in a stratified cultivation bed, particularly for desert reclamation, comprising an impermeable tank, a bottom layer of wood or stone chippings which can be supplied with water, a perforated plastics sheet covering the chippings and a top layer of growth medium comprising the above fertilizing composition mixed with sand.

9 Claims, 3 Drawing Figures

CLAY-BREAKING AND FERTILIZING COMPOSITION AND METHOD OF BREAKING AND FERTILIZING HEAVY AND COMPACTED SOILS

BACKGROUND OF THE INVENTION

The present invention relates to a fertilizing composition, to a method for its use in breaking up and fertilizing compacted and heavy soils, such as clay, and to a moisture-retaining, stratified bed for plant cultivation which makes use of the fertilizing composition.

Clay is an extremely fine-grained, hydrated and water-retaining material which is very difficult to work, from an agricultural point of view, because of its close, heavy texture and its infertility, the latter being due to its high acidity and low air-content which prevent the bacterial activity which breaks down less acid soils. Since clay, or heavy soils with a high clay content, cover wide areas of the countryside, farmers have been attempting to find easy methods of improving their structure and fertility for centuries but, until now, improvement has been achieved only by laborious mechanical breaking of the clay surface and repeated application of alkaline materials, such as lime, to reduce the acidity, and manure to increase the humus content and improve the texture.

Other soils which have become compacted, for example as a result of the use of heavy vehicles thereon, provide similar problems when it is desired to use them for agricultural purposes.

OBJECT OF THE INVENTION

The present invention seeks to provide a new composition particularly for use in improving compacted ground or heavy soils having a high clay content, quickly and easily, together with a method for its application.

SUMMARY OF THE INVENTION

Accordingly, the invention provides, according to one aspect, a fertilizing composition comprising an intimate mixture of calcium carbonate, basic phosphate, a water-soluble potash (potassium) compound and dried protein-rich manure, preferably chicken manure, in such proportions that when spread on clay soil and watered, the composition has a clay-breaking and fertilizing effect.

According to a further aspect of the invention the composition is applied to an area of compacted ground, the surface is watered and the composition is left to act on the ground, when it is found that the composition reacts in a surprising manner: the ground surface cracks, possibly due to an exothermic reaction which occurs within the composition when it is wetted, or between the alkaline composition and the acidic clay, and the composition then seeps through the cracks into the body of the clay. Here it is thought that the reaction continues and gases are evolved, possibly including or comprising carbon dioxide from the calcium carbonate and ammonia from the chicken manure. Certainly the clay structure is broken up and its acidity is reduced so that air can permeate the body of the clay; this, combined with the reduced acidity, allows bacteria to flourish, further improving the structure of the material.

The basic phosphate in the composition is preferably insoluble or sparingly soluble in water such that it releases its phosphate content in the soil only over a prolonged period to provide long-term fertility. The phosphate is conveniently a calcium phosphate which is readily obtainable in the naturally occurring form of rock phosphate; such natural phosphates have the added advantage of containing trace elements which are also essential for plant growth.

Many rock phosphates also contain calcium carbonate which is another major ingredient of the present composition. The calcium carbonate and phosphate are preferably used in a weight ratio of substantially 1:4. Since rock phosphates do not generally contain such a high carbonate content, additional carbonate compounds may be added to the rock phosphate but a preferred embodiment of the invention makes use of rock phosphate from the Gafsa Mines in Tunisia which contains the preferred proportions of carbonate to phosphate, the latter being present in the form of tricalcium diphosphate $Ca_3(PO_4)_2$.

The potash may be any of the soluble potash compounds commonly used as fertilizers, but is preferably muriate of potash (potassium chloride).

It will be appreciated that, in addition to the contribution which the dried manure makes to the initial breaking up of the clay or compacted ground, it is also a useful fertilizer, providing nitrogen needed for healthy plant growth and fibre to improve the soil structure. Its high protein content is also found to be useful.

The proportions of the basic ingredients in the present composition may be varied widely but, in order to provide a balanced fertilizer and to ensure that the ingredients react sufficiently to provide a useful breaking-up effect on a compacted soil, the composition preferably contains not less than 20% by weight of dried manure, not less than 6% by weight of potash compound and not less than 20% by weight of the carbonate/phosphate combination in the 1:4 ratio mentioned above. Preferred upper limits for the ingredients are 60% by weight for the manure and for the carbonate/phosphate combination and 35% by weight for the potash compound.

The composition according to the invention may further include an inert diluent, such as silica sand, preferably in quantities of no more than 1 part by weight of sand per 2 parts by weight of the fertilizer mixture.

In addition to the use described above, the fertilizing composition of the invention may be used on any barren or infertile land, such as moorland, slag heaps or sand to improve its fertility.

In particular, according to a further aspect of the invention there is provided a stratified bed for plant cultivation comprising a water-impervious trough, a layer of substantially water-insoluble, granular material located on the base of the trough, a water-permeable sheet covering the granular layer and a layer of cultivation medium comprising or including a fertilizing composition, as described above.

The stratified bed of the invention is of particular use in areas with irrigation problems, for example due to low annual rainfalls; it is envisaged for example, that it will be of widespread application in desert areas for land reclamation.

In use, water may be supplied to the layer of granular material where it will form an artificial water table, being prevented from draining away into the subsoil by the impermeable tank base and sides. The water level should not, however, be allowed to rise so that its upper surface is within the culture medium as this could damage the plant roots; the water level should, instead, be slightly below the permeable sheet so that it can permeate through the granular layer and sheet into the base of the culture medium. From there it will rise by capillary action through the medium to supply moisture to seeds or plants planted therein.

The culture medium preferably comprises a fertilizing composition as described above diluted with an inert material, such as sand; for this use, up to nine parts by weight of sand per one part by weight of the manure/phosphate/potash/carbonate mixture may be used.

The granular material may be stone chips, gravel or rubble but is preferably a porous material, such as wood, in the form of shavings, chips or sawdust.

The permeable sheet is preferably perforated and is conveniently a plastics sheet. The trough may also conveniently be of plastics material and may be substantially rigid or of flexible sheet material, in which case the side walls may be supported by an external casing or simply by being located in a trough dug in the ground.

According to a further aspect of the invention there is provided a method of plant cultivation including forming a structured bed and supplying water to the layer of granular material to a level below that of the permeable sheet but such that the water permeates through the granular layer to the permeable sheet and can rise through the cultivation medium by capillary action to supply moisture to seeds or plants planted in the cultivation medium.

BRIEF DESCRIPTION OF THE DRAWINGS

Several embodiments of the invention will now be more particularly described by way of example with reference to the accompanying drawings in which.

Figure 1:
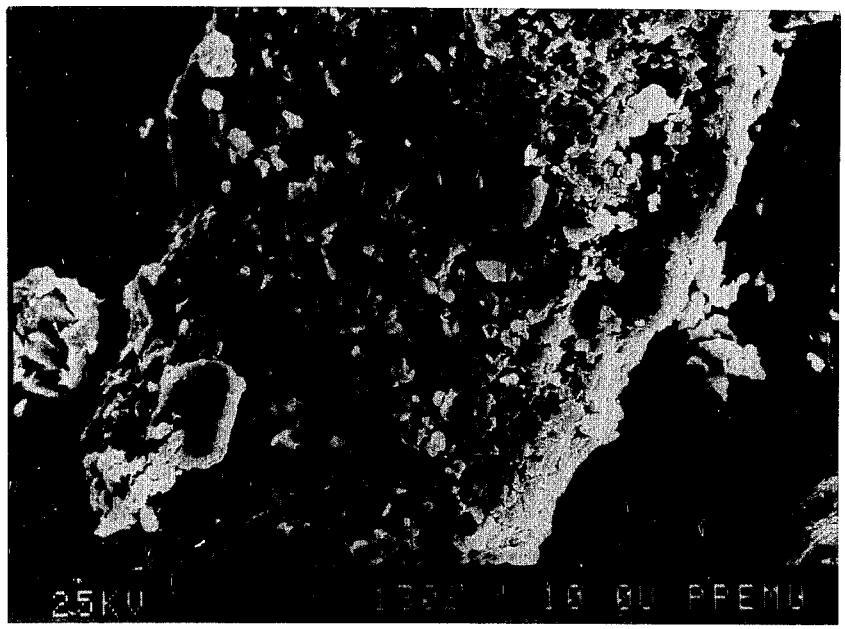
FIG. 1 is a scanning electron micrograph of clay particles.

| Ingredient | Sub-Constituents | Approx. % Constituent by weight | Parts by weight in composition A |
|---|---|---|---|
| Gafsa Rock Phosphate | CaO | 49 | 7 |
|  | $P_2O_5$ | 29.9 |  |
|  | $CO_2$ | 6.6 |  |
|  | $SiO_2$ | 3.2 |  |
|  | $SO_3$ | 3.6 |  |
|  | Other | 7.7 |  |
| Muriate of Potash | $K_2O$ | 60 | 3 |
| Dried, ground Chicken manure | Crude Protein | 23.4 | 7 |
|  | Crude Fibre | 14.0 |  |
|  | Ether Extract | 2.1 |  |
|  | Total Ash | 29.6 |  |
|  | Silica | 0.6 |  |
|  | Calcium | 8.7 |  |
|  | Magnesium | 0.5 |  |
|  | Potassium | 1.7 |  |
|  | Sodium | 0.6 |  |
|  | Phosphorus | 1.68 |  |
| Washed silica sand |  |  | 3 |

The rock phosphate is ground to British Standard Seive 300 and mixed with the other dried, ground ingredients. The phosphate and potash contents are given in the usual manner for fertilizers, in terms of the quantities of useful ingredients made available to the soil. The lime (CaO), phosphorus pentoxide ($P_2O_5$) and carbon dioxide ($CO_2$) are present in the rock phosphate as calcium carbonate and phosphates, in this case mainly tricalcium diphosphate, in a weight ratio of approximately 1:4. As is seen from the analysis, the rock also contains silica and/or silicates ($SiO_2$), sulphates (given as $SO_3$) and small quantities of other minerals, including many trace elements which are essential to plant growth. The poash is in fact, essentially potassium chloride but this may be replaced by potassium sulphate, particularly for use of the composition on land which is destined for afforestation or fruit growing.

The silica sand is present as a diluent to facilitate spreading of the material and to ensure that the concentration applied to individual areas is not too high. The fertilizing components may, alternatively, be mixed with sand, soil or other suitable medium, immediately prior to use.

EXAMPLE 2

Use of the composition of Example 1 on compacted ground or clay;

The ground to be treated is first cleared of surface vegetation and skimmed of surface soil, if necessary, to leave the subsoil, such as clay exposed; the exposed surface is levelled as much as conveniently possible. The composition of Example 1 is then spread on the ground surface at a minimum density of 270 g/m², the ground is well watered and then left.

An exothermic reaction occurs and it is found that the compacted ground cracks allowing the composition to seep into the body thereof. The pH of the ground rises: in the case of clay the pH rises from perhaps 4 to 5 before the treatment to 6.5 to 7 after treatment.

After three to four months it is found that the ground has become friable to a depth of approximately 20-25 cm, warm to the touch and aerated, the total volume of the treated layer having been increased. In particular, when used on a light-coloured clay, it is found that the clay darkens in colour, becoming reddish-brown.

The inclusion of rock phosphate, including trace elements, potash and chicken manure in the composition ensures that the treated ground is not only of the right texture for crop growing but also contains the ingredients necessary for plant growth. The resulting soil is thus immediately suitable for planting with crops without ploughing or further application of fertilizer.

Figure 2:
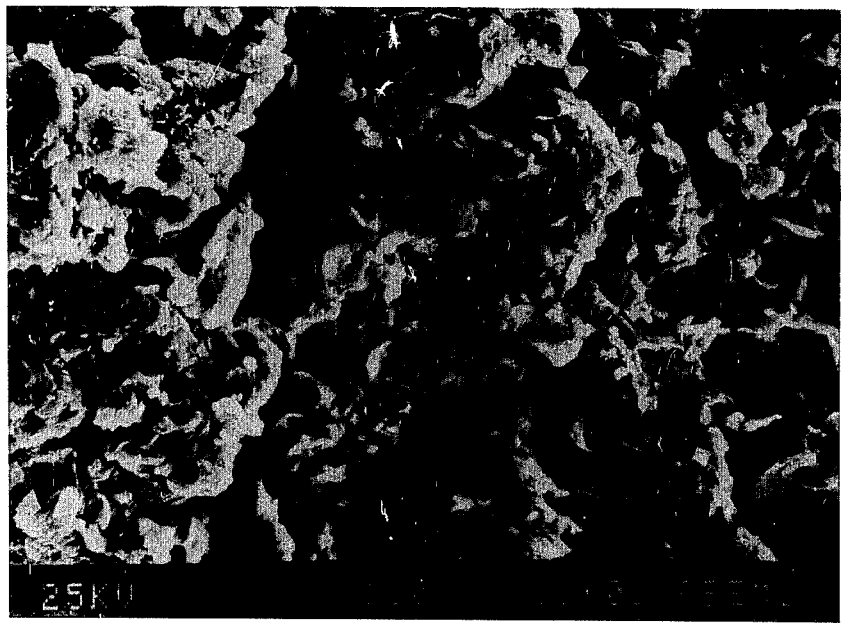
FIG. 2 is a scanning electron micrograph of clay particles after treatment with a fertilizing composition according to the invention.

Referring to the drawings, FIG. 1 shows a scanning electron micrograph of untreated clay while FIG. 2 shows a scanning electron micrograph, at the same magnification (700) as FIG. 1, of clay which had been treated with a composition similar to that of Example 1, two years previously. It is clear from the photographs that the structure of the treated clay is considerably different from that of the untreated clay. Indeed, the treated clay has a much flakier, with a larger exposed surface area than the compacted untreated clay, explaining the more friable and aerated nature of treated ground.

EXAMPLE 3

Figure 3:
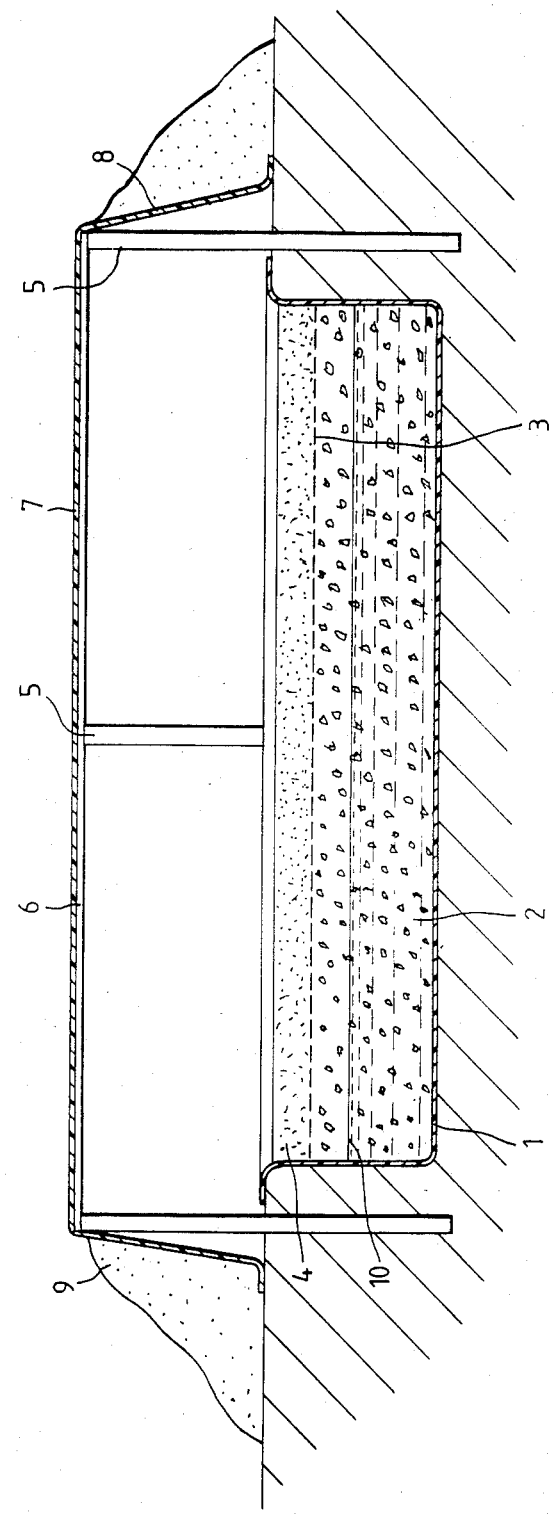
FIG. 3 is a vertical section through a stratified plant-cultivation bed according to the invention.

Referring to FIG. 3 of the drawings, a stratified plant cultivation bed is shown, not to scale, incorporating the fertilizing composition of FIG. 1.

The stratified bed includes a tank or liner 1 made from flexible sheet polythene, the base of which is set into the ground in order to provide support for the walls. The tank may be of any size but conveniently has a rectangular plan, 30 meters long by 12 meters wide, and a depth of 20 cm.

The tank 1 is filled with a mixture of stone chippings or sawdust and wood shavings 2 to a depth of approximately 15 cm. On top of the mixture 2 is layed a perforated polythene sheet 3 and this, in turn, is covered by a mixture 4 of sand or soil and the fertilizing composition of Example 1, in a 9:1 ratio by weight, to a depth of 8 to 10 cm.

A series of uprights 5, the lower ends of which are sunk into the ground around the tank 1 and, if necessary into the layers 2 and 4, with cross members 6 connected to their upper ends, support a further polythene sheet 7, of substantially the same size as the tank 1, over the top of the stratified bed. Edge portions 8 of the sheet 7 hang down to the ground and are kept in place by soil or sand 9 from the surrounding area heaped against the portions 8. Any other means for tautening the sheet 7 over the framework provided by the uprights 5 and cross-members 6 may alternatively be provided.

In use of the stratified bed described above in a hot area, seeds are planted in the mixture 4 before the sheet 7 is located over the bed. Water, shown as 10, is supplied to the lower layer 2 to a depth of approximately 10 cm: the sheet 7 may then be put in place. Further water is supplied intermittently to the bed 2, as required in order to maintain the water level at approximately 10 cm.

Although the layer 2 is not completely filled with the water 10, the water will tend to soak into the upper part of the bed and, in addition, the hot surroundings will cause water to evaporate so that water or water vapour will permeate to the perforated sheet 3 and from there will be drawn up through the mixture 4, partly by capillary action. Water will thus be supplied to the seeds to enable them to germinate and grow but will be prevented from being lost to the atmosphere by the top cover 7.

Clearly the atmosphere within the cover 7 cannot be kept permanently closed and means are provided for ventilating it as required.

The stratified bed of the invention thus allows plants to be grown, even in arid regions provided water can be made available, and it is envisaged that it will be very useful in reclamation of desert areas.

For use in a very hot area or high areas with a high ultra-violet light intensity, the upper cover 7 may be made of a material which transmits only a desired proportion of the sun's radiation in order to protect the plants from scorching. For cooler areas, a sheet 7 may be used which transmits visible and ultra-violet radiation but is less transparent to infra-red radiation in order to provide benefit from the "greenhouse" effect.

The sheet 7 and support framework 5, 6 may not be needed in some climates while, in cold climates, it may be necessary to fill the bed 2 with water 10 to a greater depth than that indicated above in order for sufficient water to permeate into the growth medium 4.

What is claimed is:

1. A clay-breaking and fertilizing composition consisting essentially of intimate mixture of from 20% to 60% by weight of dried protein-rich manure, from 6% to 35% by weight of a water-soluable potassium compound, and from 20% to 60% by weight of a combination of a basic phosphate and calcium carbonate in a weight ratio of substantially 1:4 such that, when spread on clay soil and watered, the composition has a clay-breaking and fertilizing effect.

2. A clay-breaking and fertilizing composition as claimed in claim 1, wherein said manure is chicken manure.

3. A clay-breaking and fertilizing composition as claimed in claim 1, wherein said postassium compound is selected from potassium chloride and potassium sulphate.

4. A clay-breaking and fertilizing composition as claimed in claim 1, wherein said basic phosphate and at least part of said calcium carbonate content are provided by a naturally occurring rock phosphate.

5. A clay-breaking and fertilizing composition as claimed in claim 1, including substantially 4 parts by weight of said basic calcium phosphate per 1 part by weight of said calcium carbonate.

6. A clay-breaking and fertilizing composition as claimed in claim 5, comprising substantially 7 parts by weight of dried manure, substantially 7 parts by weight of rock phosphate comprising said basic calcium phosphate and said calcium carbonate and substantially 3 parts by weight of a potassium compound selected from potassium chloride and potassium sulphate.

7. A clay-breaking and fertilizing composition as claimed in claim 1, further including up to 1 part by weight of silica sand per 2 parts by weight of said mixture of manure, potassium compound, basic phosphate and calcium carbonate.

8. A method of breaking up and fertilizing a compacted ground or heavy soil comprising the steps of:
   (a) spreading on said ground a clay-breaking and fertilizing composition consists essentially of an intimate mixture of from 20% to 60% by weight of dried protein-rich manure, from 6% to 35% by weight of water-soluable potassium compound, and from 20% to 60% by weight of a combination of a basic phosphate and calcium carbonate in a weight ratio of substantially 1:4, and
   (b) watering said ground having the composition spread thereon according to step (a) so that said composition exhibits a clay-breaking and fertilizing effect.

9. A method as claimed in claim 8 wherein said composition is spread at a density of at least 270 g of composition per square meter of ground area.

* * * * *